(12) United States Patent
Hass et al.

(10) Patent No.: US 10,958,470 B2
(45) Date of Patent: Mar. 23, 2021

(54) ATTRIBUTING BUS-OFF ATTACKS BASED ON ERROR FRAMES

(71) Applicant: Lear Corporation, Southfield, MI (US)

(72) Inventors: William D. Hass, Ann Arbor, MI (US); Lars Wolleschensky, Ann Arbor, MI (US)

(73) Assignee: Lear Corporation, Southfield, MI (US)

(*) Notice: Subject to any disclaimer, the term of this patent is extended or adjusted under 35 U.S.C. 154(b) by 226 days.

(21) Appl. No.: 16/181,522

(22) Filed: Nov. 6, 2018

(65) Prior Publication Data

US 2020/0145251 A1    May 7, 2020

(51) Int. Cl.
*G06F 21/00* (2013.01)
*H04L 12/40* (2006.01)
*G06F 21/55* (2013.01)
*G06F 11/07* (2006.01)
*H04L 29/06* (2006.01)

(52) U.S. Cl.
CPC ...... *H04L 12/40013* (2013.01); *G06F 11/079* (2013.01); *G06F 11/0736* (2013.01); *G06F 21/554* (2013.01); *H04L 63/1408* (2013.01); H04L 2012/40215 (2013.01)

(58) Field of Classification Search
CPC .. G06F 11/0736; G06F 11/079; G06F 21/554; H04L 12/40013; H04L 63/1408
See application file for complete search history.

(56) References Cited

U.S. PATENT DOCUMENTS

| | | |
|---|---|---|
| 8,955,130 B1 | 2/2015 | Kalintsev et al. |
| 9,825,918 B2 | 11/2017 | Sharma et al. |
| 9,935,774 B2 | 4/2018 | Sharma |
| 2016/0173513 A1 | 6/2016 | Rohde et al. |
| 2016/0188396 A1 | 6/2016 | Sonalker et al. |
| 2017/0373878 A1* | 12/2017 | Takada ............. H04L 12/40195 |
| 2018/0025156 A1 | 1/2018 | Dagan et al. |
| 2020/0213351 A1* | 7/2020 | Shin ...................... G06F 21/554 |

* cited by examiner

*Primary Examiner* — Jeffrey C Pwu
*Assistant Examiner* — Thong P Truong
(74) *Attorney, Agent, or Firm* — Brooks Kushman P.C.

(57) ABSTRACT

An error detector is configured to identify transmission errors and maintain a transmit error counter (TEC) value and corresponding network identifier for each of a plurality of electronic control units (ECUs) connected to a network bus. The error detector is configured to adjust the TEC values for the ECUs based on error frames and inform an intrusion detection system when an ECU changes error state. In this manner, the error detector is configured to help identify and attribute attacks by an impersonating node when a message is received containing the network identifier of a legitimate ECU that is in a Bus Off state.

20 Claims, 3 Drawing Sheets

ATTRIBUTING BUS-OFF ATTACKS BASED ON ERROR FRAMES

TECHNICAL FIELD

The present disclosure relates to a system, device and method for attributing attacks on a Controller Area Network (CAN) bus to external devices impersonating legitimate network devices.

BACKGROUND

Increasingly, modern vehicles rely on technology and connectivity that runs on complex software. Modern vehicles have multiple dedicated computers, often referred to as "electronic control units" (ECUs), for controlling various aspects of a vehicle's operation. These ECUs may, for example, control the vehicle's engine, various driver assistance technologies (e.g., forward collision warning, automatic emergency braking, and vehicle safety communications), and entertainment systems. Many of these ECUs are networked together in the vehicle environment. As the automotive industry moves towards connected cars and autonomous vehicles, cybersecurity is becoming a growing concern for vehicle manufacturers. Systems and components responsible for vehicle operation need to be protected from harmful attacks, unauthorized access, damage, or anything else that might interfere with important vehicle functions. Such unauthorized access is often referred to as an "intrusion." The methodology of detecting unauthorized access to computer networks or electronic systems is often referred to as "intrusion detection."

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One or more embodiments of the present disclosure are directed to a method for attributing bus-off attacks based on error frames. The method may include maintaining an estimated transmit error counter (TEC) value for each of a plurality of electronic control units (ECUs) connected to a network bus. Each estimated TEC value is associated with a network identifier corresponding to a respective ECU. The method may also include monitoring error frames transmitted over the network bus by the plurality of ECUs and adjusting the estimated TEC value for at least one of the plurality of ECUs upon receiving an error frame transmitted on the network bus. The method may also include informing an anomaly detection system when one of the plurality of ECUs changes error state based on the estimated TEC value for that ECU. Other embodiments of this aspect may include corresponding computer systems, apparatus, and computer programs recorded on one or more computer storage devices, each configured to perform the actions of the methods.

Implementations may include one or more of the following features. The method where adjusting the estimated TEC value for at least one of the plurality of ECUs upon receiving an error frame transmitted on the network bus may include: receiving an error frame containing enough bits to identify a transmitting ECU based on it network identifier; and increasing the estimated TEC value for the transmitting ECU based on its network identifier. The method where adjusting the estimated TEC value for at least one of the plurality of ECUs upon receiving an error frame transmitted on the network bus may also include: determining whether the error frame is indicative of a bit-stuff error when the network identifier is unknown; and in response to detecting a bit-stuff error, increasing the estimated TEC value for all ECUs that are actively transmitting.

The method may further include: receiving a data frame from a transmitting ECU over the network bus; detecting an error in the data frame; and increasing the estimated TEC value for the transmitting ECU based on its network identifier. The method may also include: receiving a data frame from a transmitting ECU over the network bus; and decreasing the estimated TEC value for the transmitting ECU based on its network identifier when no transmission errors are detected.

The method where informing the anomaly detection system when an ECU changes error state may include informing the anomaly detection system when an ECU transitions from an error active state to an error passive state based on the estimated TEC value for that ECU. Additionally, the method where informing the anomaly detection system when an ECU changes error state may include informing the anomaly detection system when an ECU transitions from an error passive state to a bus off state based on the estimated TEC value for that ECU. The method further including: detecting an attack on the network bus by an impersonating ECU when a message having a network identifier belonging to a target ECU in the bus off state is received. Implementations of the described techniques may include hardware, a method or process, or computer software on a computer-accessible medium.

One or more additional embodiments of the present disclosure are directed to an error detector connected to a Controller Area Network (CAN) bus. The error detector may include a transceiver and a processor. The processor may be configured to maintain a transmit error counter (TEC) value for each of a plurality of electronic control units (ECUs) connected to the CAN bus, each TEC value being associated with a network identifier corresponding to a respective ECU. The processor may be further configured to identify at least a first ECU transmitting an error frame over the CAN bus by its network identifier and increment the TEC value associated with the first ECU. The processor may be further configured to transmit, via the transceiver, a message to an anomaly detection system indicating the first ECU has changed error states in response to the TEC value associated with the first ECU reaching a predetermined value.

Implementations may include one or more of the following features. The error detector may be integral with a gateway/domain controller. The anomaly detection system may include an intrusion detection system. The predetermined value may be indicative of the first ECU transitioning to an error passive state from an error active state. Alternatively, the predetermined value may be indicative of the first ECU transitioning to a bus off state. The processor may be further configured to detect an attack on the CAN bus by an impersonating ECU when a message having a network identifier belonging to the first ECU in the bus off state is received. Implementations of the described techniques may include hardware, a method or process, or computer software on a computer-accessible medium.

One or more additional embodiments of the present disclosure is directed to a system for attributing bus-off attacks based on error frames. The system may include: a network bus; a plurality of electronic control units (ECUs) connected to the network bus, each of the plurality of ECUs having a network identifier; and an error detector connected to the network bus. The error detector may include a transceiver and a processor, where the processor is configured to: maintain a transmit error counter (TEC) value for each of the plurality of ECUs based on their corresponding network identifier; identify at least a first ECU transmitting an error frame over the network bus by its network identifier; increment the TEC value associated with the first ECU; and transmit, via the transceiver, a message to an anomaly detection system indicating the first ECU has changed error states in response to the TEC value associated with the first ECU reaching a predetermined value.

Implementations may include one or more of the following features. The error detector may be integral with a gateway/domain controller. The anomaly detection system may include an intrusion detection system. The predetermined value may be indicative of the first ECU transitioning to an error passive state. The predetermined value may be indicative of the first ECU transitioning to a bus off state. The processor may be further configured to detect an attack on the network bus by an impersonating ECU when a message having a network identifier belonging to the first ECU in the bus off state is received. Implementations of the described techniques may include hardware, a method or process, or computer software on a computer-accessible medium.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
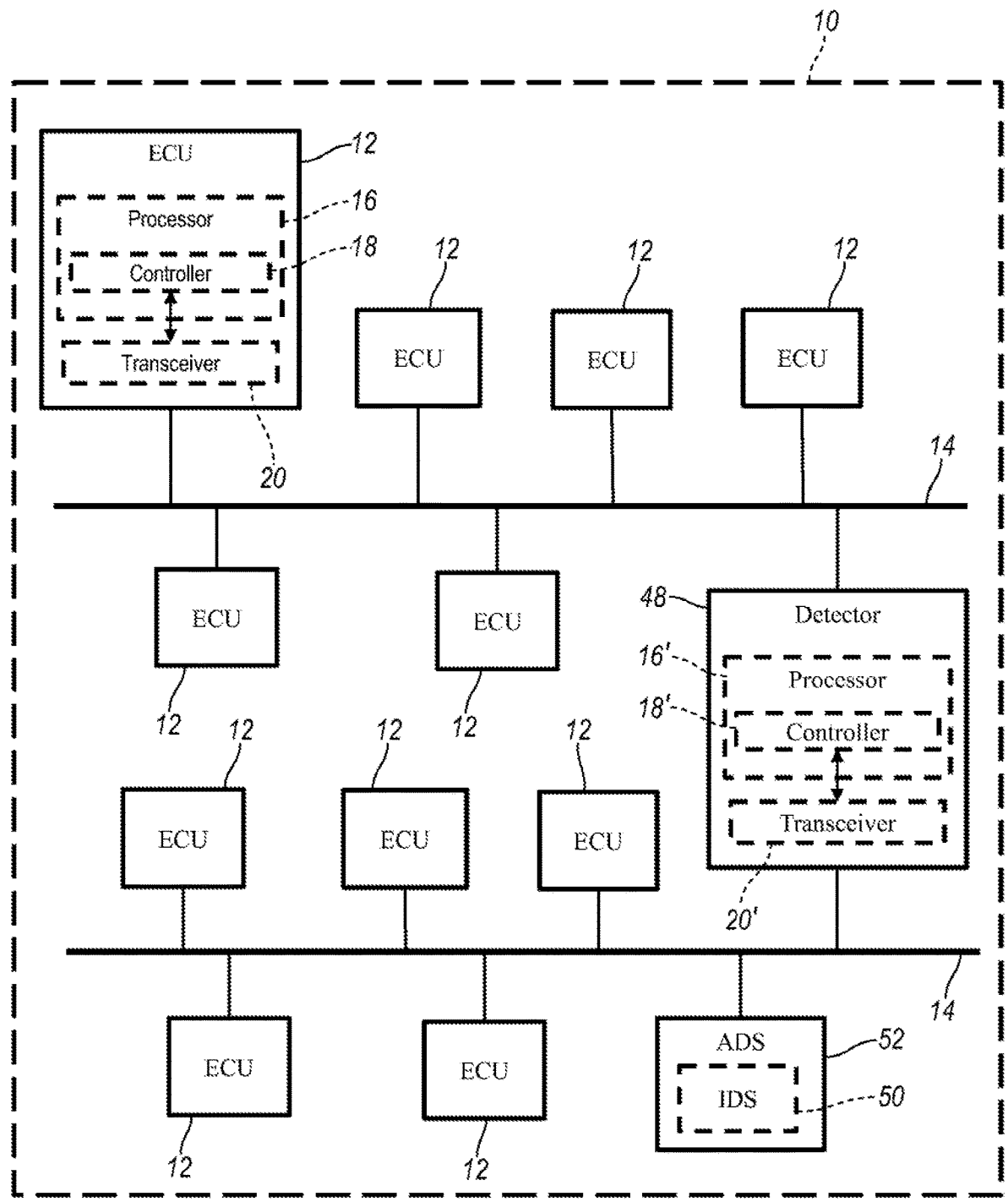
FIG. 1 is a schematic illustration of a system for attributing bus-off attacks, in accordance with one or more embodiments of the present disclosure.

Referring to FIG. 1, a vehicle 10 may include a plurality dedicated computing devices called electronic control units (ECUs) 12 for controlling various aspects of the vehicle's operation. The ECUs 12 may include such vehicle control devices as an engine control module (ECM), a transmission control module (TCM), battery control module (BCM), an anti-lock braking system (ABS), and the like. In addition, the ECUs 12 may include dedicated computing devices in the vehicle 10 for controlling various other systems such as climate systems, infotainment systems, and security systems. These ECUs 12 may be networked together using a network bus 14, such as a Controller Area Network (CAN) bus. As shown in FIG. 1, the vehicle 10 may include multiple network buses 14.

In general, each ECU 12 may include a processor 16 that runs firmware or software. The processor 16 may be a programmed digital computing device including a central processing unit (CPU) and a random-access memory (RAM). Each ECU 12 may further include a network controller 18 and network transceiver 20. The processor 16 and network controller 18 may transmit and receive messages over the network bus 14 via the network transceiver 20. Together the network controller 18 and network transceiver 20 implement the network bus protocol and handle communications over the network bus 14. The network controller 18 may be part of, or separate from, the processor 16. In the case of a CAN bus being employed, for example, the network controller 18 and network transceiver 20 may be referred to as a "CAN controller" and a "CAN transceiver," respectively, which collectively implement the CAN bus protocol and handle communication over the CAN bus.

The ECUs 12 may broadcast multi-bit messages called "frames" over the network bus 14, per the bus protocol being employed. The network bus 14 may be a broadcast type of bus, such as a CAN bus, meaning that all nodes (e.g., the ECUs 12) can "hear" all transmissions. For ease of explanation, the network bus 14 described herein is a CAN bus employing the CAN bus protocol. Because all nodes "hear" all transmissions, there is no way to send a message to just a specific node. In the CAN bus protocol, which is a synchronous protocol, time is split into bit-time slots. There can be only one bit value on the bus during each bit-time slot. A "collision" occurs whenever two ECUs attempt to broadcast different bits during the same bit-time slot. When a collision occurs, the dominant bit (the "zero" bit in the CAN protocol) overwrites (i.e., trumps) the recessive bit (the "one" bit in the CAN protocol). Accordingly, the dominant bit, rather than the recessive bit, is carried by the bus and the ECU that broadcasted the dominant bit may be said to have "won" the collision, while the other ECU may be said to have "lost" the collision.

Figure 2:
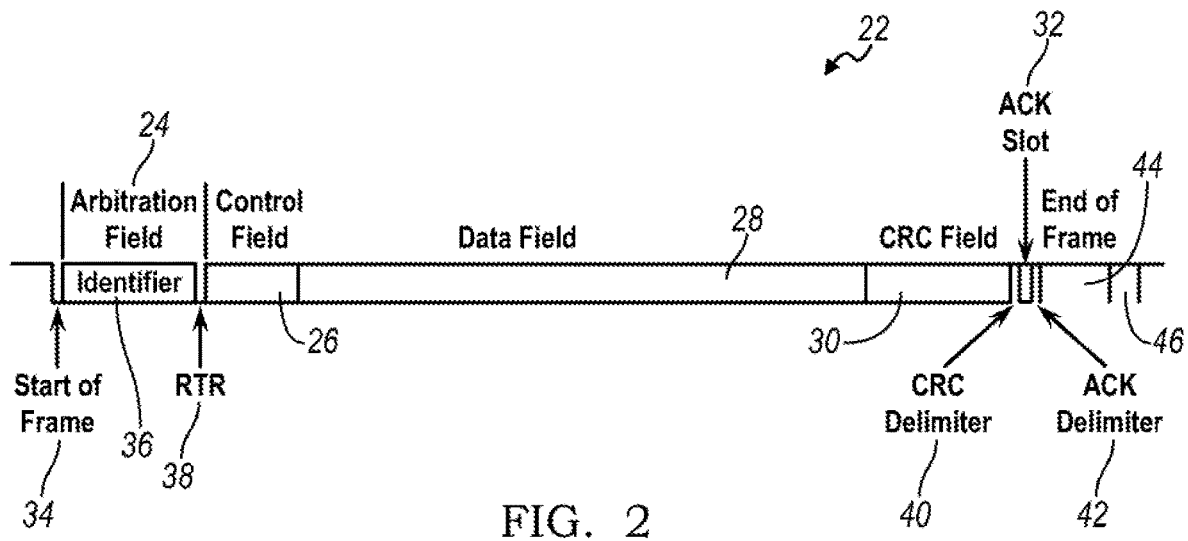
FIG. 2 is an exemplary data frame for a common network bus protocol, such as CAN.

The most common message type on the network bus is a data frame. FIG. 2 depicts an exemplary data frame 22 using the CAN protocol. The data frame 22 may include several parts or fields. In certain versions of the CAN protocol, some of the major parts or fields of the data frame 22 may include: (1) an Arbitration field 24; (2) a Control field 26; (3) a Data field 28; (4) a cyclic redundancy check or "CRC" Field 30; and (5) an Acknowledgement Slot 32. A start-of-frame (SOF) field 34 containing a single dominant bit may designate the start of the message.

The Arbitration field 24, which determines the priority of the message when two or more nodes are contending for the bus, may contain at least a message identifier, referred to herein as a network identifier 36, and a remote transmission request or "RTR" bit 38. The RTR bit 38 is dominant for data frames. The network identifier 36, having 11 or 29 bits, may indicate the type of the message (and hence, typically, the ECU from which the message originated). The Control field 26 may include a four-bit data length code ("DLC"), which stores the length of the subsequent Data field 28. The Data field 28 may contain zero to eight bytes of data. The CRC Field 30 may contain a 15-bit checksum, calculated on most parts of the message, used for error detection and a CRC Delimiter 40. The CRC Field 30 ensures that all bits are transmitted correctly, and errors can be detected. The Acknowledgement Slot 32 may host an Acknowledgement bit. Any CAN controller that has been able to correctly receive the message sends an Acknowledgement bit at the end of each message. The CAN transceiver checks for the presence of the Acknowledgement bit and retransmits the message if no acknowledge was detected.

In at least some versions of the CAN bus protocol, each successfully-transmitted data frame ends with eleven consecutive recessive bits, including a one-bit Acknowledgement Delimiter 42 field and a seven-bit end-of-frame (EOF) field 44, followed by a three-bit intermission (IS) field 46. Immediately following the IS field 46, another message may be transmitted over the bus.

When data is transmitted by CAN, no stations or nodes are addressed. Instead, the content of the message (e.g. rpm or engine temperature) may be designated by the network identifier 36, in the Arbitration field 24, that is unique throughout the network. The network identifier 36 defines not only the content but also the priority of the message, as compared with another less urgent message, which is important for bus allocation when several stations are competing for bus access. The priorities may be laid down during system design in the form of corresponding binary values. In CAN, the message/network identifier with the lowest binary number usually has the highest priority since the "zero" bits are dominant. Bus access conflicts may, therefore, be resolved by the above-described bitwise arbitration on the network identifiers by each node observing the bus level bit for bit. All "losers" automatically become receivers of the message with the highest priority and do not re-attempt transmission until the bus is available again.

While attempting to broadcast each bit in a message, the transmitting ECU also monitors the network bus 14, to verify whether the attempted broadcast was successful. Indeed, every ECU 12 on the network bus 14 may listen to its own message while transmitting. If the actual value on the bus is different from that which the ECU attempted to broadcast, then the broadcast may be deemed unsuccessful. Consequently, the transmitting ECU may identify a "bit-error" and may stop broadcasting the message. Further, the transmitting ECU may broadcast an error flag (or "error frame") and/or increment its Transmit Error Counter (TEC). If the ECU is in a normal operating state, referred to as the "Error Active" mode, the broadcasted error flag is an "Active Error" flag. An Active Error flag may, for example, consist of six dominant bits, thereby destroying the bus traffic.

Each node on the network bus 14 may maintain two error counters: the above-referenced Transmit Error Counter (TEC) and a Receive Error Counter (REC). There may be several rules governing how these counters are incremented and/or decremented. Generally, a transmitting node or ECU detecting a fault may increment its Transmit Error Counter faster than the listening nodes will increment their Receive Error Counters. Correctly transmitted and/or received messages may cause the Error counter(s) to decrease.

Figure 3:
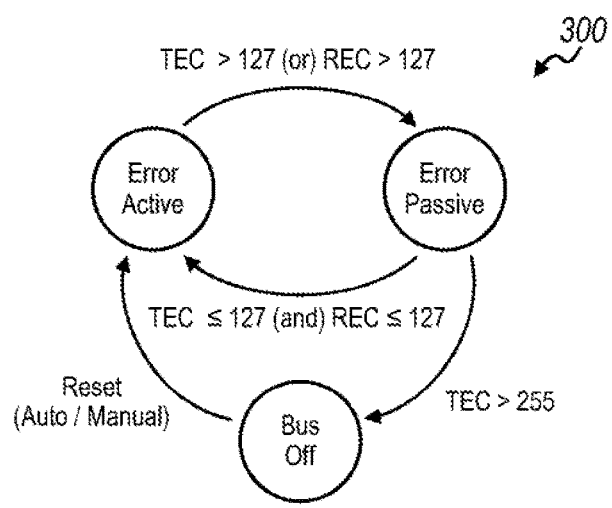
FIG. 3 is a state diagram depicting various error states and transitions based on error counters.

Referring to the state diagram 300 illustrated in FIG. 3, a node may typically start out in Error Active mode. When any one of the two Error Counters rises above a first threshold value (e.g., 127), the node may enter a state referred to as "Error Passive" mode. An Error Passive node may transmit Passive Error flags when it detects errors. Passive Error flags may contain, for example, six recessive bits, unlike the dominant bits in an Active Error flag. Accordingly, a Passive Error flag may not destroy other bus traffic and, thus, the other nodes may not "hear" the transmitting node or ECU complaining about bus errors.

When both Error Counters are less than or equal to the first threshold value, the node may return to the "Error Active" state. For example, an ECU may have its TEC reduced by one, following each successful broadcast of a message. Accordingly, following a sufficient number of successful broadcasts, the ECU may exit the Error Passive state and return to normal broadcasting. On the other hand, when the TEC rises above a second threshold value (e.g., 255), the node may enter a "Bus Off" state. A node or ECU in the Bus Off state is disabled and is not allowed to broadcast at all.

The increasingly complex network of computer systems in a modern automobile, which communicate largely via the network bus, perform even the most fundamental vehicular functions. These computerized systems and components responsible for vehicle operation need to be protected from harmful attacks, unauthorized access, damage, or anything else that might interfere with important vehicle functions, particularly those relating to safety and security. In one type of spoofing attack, an attacker obtains control of one of the ECUs, and uses this subverted ECU to impersonate another one of the ECUs, by broadcasting, over the network, impersonating messages that appear to originate from the other one of the ECUs. Bus-off attacks may further exploit the error-handling scheme of in-vehicle networks described above. These attacks may be difficult to detect by the authorized ECUs, rendering them potential threats for the vehicle 10.

Bus-off attacks against a target ECU may induce transmission errors, and then transition the state of the target ECU to the Bus Off state, in which the ECU cannot access the network bus 14. An "attacker" (also referred to as an "attacking ECU" or "impersonating ECU") periodically injects attack messages to the network bus 14, deceives an uncompromised ECU into thinking it is defective, and eventually forces itself or even the whole network to shut down. As described above, a transmit error occurs when an ECU detects a difference between the message that it is sending versus what it "hears" on the network bus while monitoring its own transmission. After a transmit error is detected, the transmitting ECU increases its TEC and sends either an Active Error frame or Passive Error frame depending on its current error state. Depending on the current TEC value, the ECU may enter the Bus Off mode and stop transmitting messages altogether.

During a bus-off attack, the attacker or impersonating ECU merely has to change one bit of the target ECU's message from 1 to 0. The target ECU notices the difference between the message it is sending versus receiving (while monitoring its own traffic) and increases its TEC. Once the attacker has done this often enough, the legitimate, target ECU enters Bus Off mode. When this occurs, the attacker can now impersonate the target ECU by sending fake traffic on the network bus 14. The other nodes in the network are unaware when an ECU enters the Bus Off state because they are only concerned with maintaining their own TEC. It is worth noting that these attacks occur to either the Control Field, Data Field, CRC Field, or EOF. Accordingly, the Arbitration field containing the network identifier may remain legitimate. Because the Arbitration field is legitimate when an attacker impersonates the target ECU, and the other nodes or ECUs on the network bus 14 are unaware the target ECU is in Bus Off mode, it is difficult for other nodes to determine whether the message is valid.

Referring back to FIG. 1, the vehicle 10 may include an error detector 48, connected to the network bus 14, for detecting error frames. To counter bus-off attacks, the error detector 48 may track TEC values for all ECUs 12, determine when a particular ECU changes state (e.g., Error Active to Error Passive or Error Passive to Bus Off), and inform the vehicle's intrusion detection system (IDS) 50. The IDS 50 may be part of an overall anomaly detection system (ADS) 52 residing in the vehicle 10. The error detector 48 may be a dedicated ECU for detecting error frames and tracking TEC values associated with all other ECUs 12 connected to the network bus 14. Alternatively, the error detector 48 may be an integral part of an ECU or other microcontroller for performing a different function. For instance, in some embodiments, the error detector 48 may reside in a gateway or domain controller (not shown), which already acts as acts as router/firewall between networks for the vehicle 10. Accordingly, as shown in FIG. 1, the error detector 48 may be connected to multiple network buses 14.

Like the other ECUs 12 connected to the network bus 14, the error detector 48 may include at least a processor 16', a network controller 18', and a network transceiver 20'. The network controller 18' may be part of, or separate from, the processor 16'. The processor 16' is typically a programmed digital computing device comprising a central processing unit (CPU) and a random access memory (RAM), as well as, optionally, non-volatile secondary storage, and/or peripheral devices. Program code, including software programs, and/or data, may be loaded into the RAM for execution and processing by the CPU, and results may be generated for output. The program code and/or data may be downloaded to the processor in electronic form, over a network, for example, or it may, alternatively or additionally, be provided and/or stored on non-transitory tangible media, such as magnetic, optical, or electronic memory. Such program code and/or data, when provided to the processor, produce a machine or special-purpose computer, configured to perform the tasks described herein.

To properly attribute bus-off attacks, the error detector 48 may track or otherwise estimate the TEC value for all ECUs 12 on the network bus 14. Accordingly, the error detector 48 may keep a complete list or look-up table of all ECUs 12 and their associated network identifiers. The error detector 48 may further maintain an estimated TEC value for each ECU 12 in the list or look-up table. In order to do so accurately, the error detector 48 may be knowledgeable of how the TEC system works for a particular vehicle or original equipment manufacturer, as these may vary. By monitoring the TEC values of all networked ECUs, the error detector 48 can inform the intrusion detection system 50 when an ECU 12 changes state (e.g., Error Active to Error Passive or Error Passive to Bus Off). In this manner, if a message with a network identifier that belongs to an ECU in the Bus Off state is received, the IDS/ADS may know that an attack is occurring and can take some form of remedial action. In some embodiments, the error detector 48 may even be integrated into the intrusion detection system 50.

The error detector 48 may monitor several fields in each frame transmitted via the network bus 14 to maintain an estimated TEC value for each ECU 12 connected to the bus. For instance, the error detector 48 can monitor the network identifiers for each ECU 12 because an attacker cannot change the network identifiers. Moreover, the error detector 48 may monitor the CRC field. As an attacker can only change 1s to 0s, it is extremely difficult for an attacker to inject a message with a correct CRC. Depending on the implementation of active and passive errors, the error detector 48 may check its estimated TEC value for a target ECU against the actual TEC value in the target ECU based on the changed and observable ECU behavior when a state change occurs. Moreover, once the error detector 48 notices that an ECU changes state based on ECU behavior (e.g., Error Active to Error Passive or Error Passive to Bus Off), it can inform the intrusion detection system 50.

Based on its count of estimated TEC values, the error detector 48 can report a status change for a certain ECU (i.e., the ECU switches to a different Error state). The error detector 48 may also periodically report the estimated TEC values for all ECUs 12 to the IDS 50. The IDS 50 can take action based on this information. For instance, the IDS 50 can use the information to determine whether the system is being attacked based in conjunction with other inputs. If the error detector 48 reports that an ECU 12 is in Bus Off mode and a frame is received with a network identifier of that particular ECU, the error detector 48 and/or the IDS 50 could simply ignore the malicious message, send out a security alert to the rest of the ECUs 12 on the same bus, report an active attack on a target ECU by an impersonating ECU, and/or step on the message. Stepping on the message means that the error detector 48 or IDS 50 can invalidate the message by causing an error on the network bus 14 destroying the message. The error detector 48 and/or the IDS 50 may also trigger an alert to a different vehicle or cloud system, which would use that information as input to a more complex process.

Figure 4:
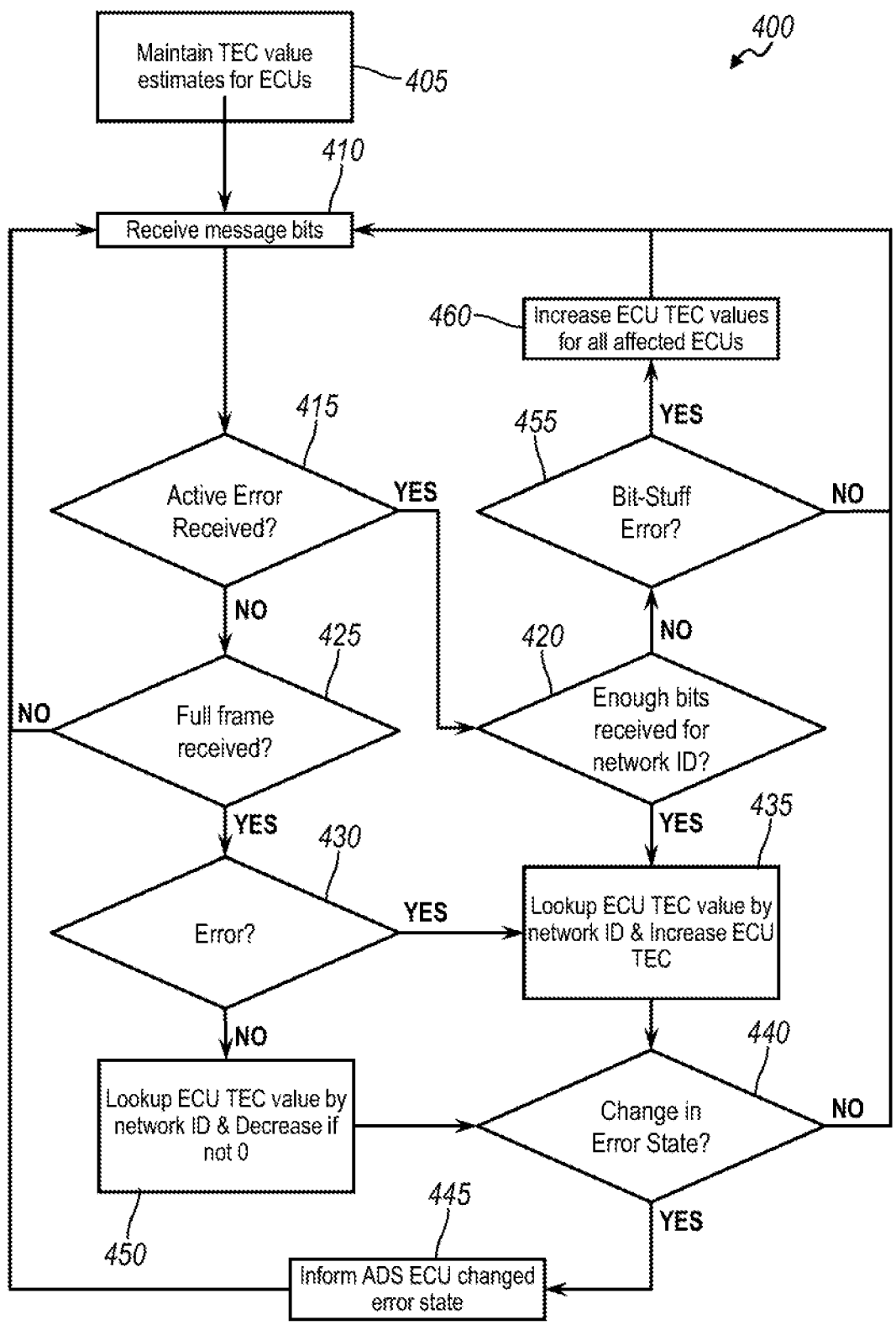
FIG. 4 is a flow chart depicting a method for attributing bus-off attacks based on error frames, in accordance with one or more embodiments of the present disclosure.

FIG. 4 is a flow chart depicting a method 400 for attributing bus-off attacks based on error frames, in accordance with one or more embodiments of the present disclosure. As an introduction to the method, provided at step 405, the error detector 48 may maintain an estimated TEC value for each ECU 12 connected to the network bus 14. As previously described, this may include maintaining a table in memory that includes each ECU 12, each ECU's associated network identifier (e.g., CAN ID), and the estimated TEC value for each ECU. The error detector 48 may also receive message bits transmitted over the vehicle network and may monitor these transmissions for error frames or other transmission errors, as provided at step 410. Based on whether an error is detected, or the type of error detected, the error detector 48 may adjust the estimated TEC value it maintains for one or more ECUs.

Upon receiving message bits from an ECU 12 transmitting via the network bus 14, the error detector 48 may determine whether a message that got sent incorrectly was received (i.e., whether an Active Error has been received), as provided at step 415. As previously described, an error detected by an ECU in Error Active mode will transmit an error frame on the bus that is signaled by six dominant bits in a row, which destroys bus traffic. Thus, at step 415, the error detector 48 may determine whether a message that got sent incorrectly was received based upon receiving these six dominant bits in a row. If so, the error detector 48 may determine an Active Error has been received and the method may proceed to step 420. If not, the method may proceed to step 425 where the error detector 48 may determine whether a full data frame has been received. Full frames that are received might still have errors because every other node is in Error Passive mode. As previously described, an Error Passive node may transmit Passive Error flags when it detects errors. Passive Error flags may contain six recessive bits and, thus, may not destroy other bus traffic, so the other nodes may not "hear" the transmitting node or ECU complaining about bus errors. If a full frame is not received, the method may return to step 410 without adjusting any TEC values in its table of estimated TEC values. If, however, a full frame is received, the method may proceed to step 430.

At step 430, when a full frame is received, the error detector 48 may check for errors in the frame. As mentioned above, full frames that are received might still have errors because everybody else is in Error Passive mode. Therefore, the error detector 48 may perform all the error checks. If an error is detected in the frame, the method may proceed to step 435. At step 435, the error detector 48 may look up the estimated TEC value for the transmitting ECU based on the network identifier in the Arbitration Field of the frame. Moreover, the error detector 48 may increment the estimated TEC value associated with the transmitting ECU as identified by the network identifier. The error detector 48 may increment the estimated TEC value in an amount commensurate with how the transmitting ECU would increment its TEC based on the rules for the particular system governing how these counters are incremented and decremented. The method may then proceed to step 440 where the error detector 48 may determine whether the transmitting ECU undergoes a change in error state (e.g., Error Active to Error Passive; Error Passive to Bus Off) based on the estimated TEC value. If no change in error state is identified, the method may return to step 410. If a change in error state is identified based on the adjusted TEC value as maintained by the error detector 48, the method may proceed to step 445. At step 445, the error detector 48 may inform the IDS 50 of the change in error state so the IDS 50 knows which nodes should be in which error state and can take remedial action, if necessary, as previously described.

Returning to step 430, if no error is detected in the frame, the method may proceed to step 450. At step 450, the error detector 48 may look up the estimated TEC value for the transmitting ECU based on the network identifier in the Arbitration Field of the frame. Moreover, if the estimated TEC value is not zero already, the error detector 48 may decrement the estimated TEC value associated with the transmitting ECU as identified by the network identifier. The error detector 48 may decrement the estimated TEC value in an amount commensurate with how the transmitting ECU would decrement its TEC based on the rules for the particular system governing how these counters are incremented and decremented. The method may then proceed to step 440 where the error detector 48 may determine whether the transmitting ECU undergoes a change in error state (i.e., Error Passive to Error Active) based on the estimated TEC value. Again, at step 440, if no change in error state is identified, the method may return to step 410. If a change in error state is identified based on the adjusted TEC value as maintained by the error detector 48, the method may proceed to step 445 where the IDS 50 may be informed of the change in the ECU's error state.

Returning to step 415, if the error detector 48 determines an Active Error has been received, the method may proceed to step 420, as set forth above. At step 420, the error detector 48 may determine whether enough message bits have been received to ascertain the network identifier of the transmitting ECU. In some embodiments, it is possible for errors to occur and a network identifier cannot be ascertained. For instance, all transmitting ECUs try to access the network bus at the same time by sending their network identifiers and the network ID with the highest priority wins access rights. Because the network identifier getting access is decided in this so-called negotiation, if there is in an error in the negotiation process, the error detector 48 may not be able to identify the origin of the error. However, the same is true for all other ECUs on the bus. Nobody knows who caused the error, so no error is raised. If the bits received by the error detector 48 are not enough to ascertain the network ID, the method may proceed to step 455 to determine if a bit-stuff error has occurred.

At step 455, the error detector 48 may determine whether the error is a "bit-stuff" error. As understood by one of ordinary skill in the art, a bit-stuff error may be detected when more than five consecutive bits of the same level occurs on the bus. In some embodiments, the only errors that may legitimately occur are bit-stuff errors because other anomalies by an attacker would simply fall in the category of standard bus arbitration. In CAN, for example, when a bit-stuff error occurs, due to the nature of the CAN protocol, all ECUs undergoing arbitration are actively transmitting synchronously. It should be noted that not all ECUs would be undergoing arbitration when the first bit-stuff error could occur, so the error detector 48 may also need to determine which ECUs were performing arbitration. If a bit-stuff error is detected, the method may proceed to step 460.

Regarding step 460, all ECUs undergoing arbitration are actively transmitting. Therefore, a bit-stuff error would increase the TEC values of all those ECUs (e.g., by 1). Accordingly, the error detector 48 may likewise increase the estimated TEC values for all affected ECUs. The method may then return to step 410. If a bit-stuff error is not detected, the method may skip step 460 and return directly to step 410 where the error detector 48 may continue to receive bits and monitor the network bus for errors. Returning to step 420, if enough bits are received by the error detector 48 to ascertain the network ID of the transmitting ECU sending the error flag, the method may proceed to step 435 and the flow may continue as previously described.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for attributing bus-off attacks based on error frames comprising:
   maintaining, by an error detector, an estimated transmit error counter (TEC) value for each of a plurality of electronic control units (ECUs) connected to a network bus, each estimated TEC value being associated with a network identifier corresponding to a respective ECU;
   monitoring, by the error detector, error frames transmitted over the network bus by the plurality of ECUs;
   adjusting, by the error detector, the estimated TEC value for at least one of the plurality of ECUs upon receiving an error frame transmitted on the network bus; and
   informing an anomaly detection system when one of the plurality of ECUs changes error state based on the estimated TEC value for that ECU.

2. The method of claim 1, wherein adjusting the estimated TEC value for at least one of the plurality of ECUs upon receiving an error frame transmitted on the network bus comprises:
   receiving an error frame containing enough bits to identify a transmitting ECU based on it network identifier; and
   increasing the estimated TEC value for the transmitting ECU based on its network identifier.

3. The method of claim 1, wherein adjusting the estimated TEC value for at least one of the plurality of ECUs upon receiving an error frame transmitted on the network bus comprises:

determining whether the error frame is indicative of a bit-stuff error when the network identifier is unknown; and in response to detecting a bit-stuff error, increasing the estimated TEC value for all ECUs that are actively transmitting.

4. The method of claim 1, further comprising:

receiving, at the error detector, a data frame from a transmitting ECU over the network bus;

detecting an error in the data frame; and increasing, by the error detector, the estimated TEC value for the transmitting ECU based on its network identifier.

5. The method of claim 1, further comprising:

receiving, at the error detector, a data frame from a transmitting ECU over the network bus; and decreasing, by the error detector, the estimated TEC value for the transmitting ECU based on its network identifier when no transmission errors are detected.

6. The method of claim 1, wherein informing the anomaly detection system when an ECU changes error state includes informing the anomaly detection system when an ECU transitions from an Error Active state to an Error Passive state based on the estimated TEC value for that ECU.

7. The method of claim 1, wherein informing the anomaly detection system when an ECU changes error state includes informing the anomaly detection system when an ECU transitions from an Error Passive state to a Bus Off state based on the estimated TEC value for that ECU.

8. The method of claim 7, further comprising:

detecting an attack on the network bus by an impersonating ECU when a message having a network identifier belonging to a target ECU in the Bus Off state is received.

9. An error detector connected to a Controller Area Network (CAN) bus, the error detector comprising:

a transceiver; and a processor configured to:

maintain a transmit error counter (TEC) value for each of a plurality of electronic control units (ECUs) connected to the CAN bus, each TEC value being associated with a network identifier corresponding to a respective ECU;

identify at least a first ECU transmitting an error frame over the CAN bus by its network identifier;

increment the TEC value associated with the first ECU; and transmit, via the transceiver, a message to an anomaly detection system indicating the first ECU has changed error states in response to the TEC value associated with the first ECU reaching a predetermined value.

10. The error detector of claim 9, wherein the error detector is integral with a gateway/domain controller.

11. The error detector of claim 9, wherein the anomaly detection system includes an intrusion detection system.

12. The error detector of claim 9, wherein the predetermined value is indicative of the first ECU transitioning to an Error Passive state from an Error Active state.

13. The error detector of claim 9, wherein the predetermined value is indicative of the first ECU transitioning to a Bus Off state.

14. The error detector of claim 13, wherein the processor is further configured to detect an attack on the CAN bus by an impersonating ECU when a message having a network identifier belonging to the first ECU in the Bus Off state is received.

15. A system for attributing bus-off attacks based on error frames comprising:

a network bus;

a plurality of electronic control units (ECUs) connected to the network bus, each of the plurality of ECUs having a network identifier; and an error detector connected to the network bus, the error detector including a transceiver and a processor, wherein the processor is configured to:

maintain a transmit error counter (TEC) value for each of the plurality of ECUs based on their corresponding network identifier;

identify at least a first ECU transmitting an error frame over the network bus by its network identifier;

increment the TEC value associated with the first ECU; and transmit, via the transceiver, a message to an anomaly detection system indicating the first ECU has changed error states in response to the TEC value associated with the first ECU reaching a predetermined value.

16. The system of claim 15, wherein the error detector is integral with a gateway/domain controller.

17. The system of claim 15, wherein the anomaly detection system includes an intrusion detection system.

18. The system of claim 15, wherein the predetermined value is indicative of the first ECU transitioning to an Error Passive state.

19. The system of claim 15, wherein the predetermined value is indicative of the first ECU transitioning to a Bus Off state.

20. The system of claim 19, wherein the processor is further configured to detect an attack on the network bus by an impersonating ECU when a message having a network identifier belonging to the first ECU in the Bus Off state is received.

* * * * *